United States Patent [19]

Aschberger et al.

[11] Patent Number: 4,729,495
[45] Date of Patent: Mar. 8, 1988

[54] CIRCUIT CONFIGURATION FOR THE CONTROLLED FILLING AND REFILLING OF CONTAINERS WITH LIQUIDS

[75] Inventors: Matthias Aschberger; Karlheinz Färber, both of Giengen; Anton Deininger, Bachhagel, all of Fed. Rep. of Germany

[73] Assignees: The Coco-Cola Company, Atlanta, Ga.; Bosch-Siemens Hausgerate GmbH, Munich, Fed. Rep. of Germany

[21] Appl. No.: 768,214

[22] Filed: Aug. 22, 1985

[30] Foreign Application Priority Data

Aug. 22, 1984 [DE] Fed. Rep. of Germany ....... 3430907

[51] Int. Cl.$^4$ .......................... G04C 1/12; B67D 5/56
[52] U.S. Cl. ........................................ 222/56; 222/65; 222/641; 222/129.4
[58] Field of Search ................... 222/64, 641, 14, 640, 222/65, 129.4, 644, 56; 137/624.11

[56] References Cited

U.S. PATENT DOCUMENTS

| | | | |
|---|---|---|---|
| 3,668,479 | 6/1972 | Weston et al. | 222/641 |
| 4,189,067 | 2/1980 | Nottke et al. | 222/57 |
| 4,194,650 | 3/1980 | Nottke et al. | 222/57 |
| 4,308,941 | 1/1982 | Rist et al. | 222/64 |
| 4,362,033 | 12/1982 | Young | 222/64 |
| 4,406,247 | 9/1983 | Baughman et al. | 222/65 |
| 4,493,441 | 1/1985 | Sedam et al. | 222/129.1 |
| 4,497,348 | 2/1985 | Sedam | 141/2 |
| 4,545,505 | 10/1985 | Mueller et al. | 222/65 |
| 4,656,933 | 4/1987 | Aschberger et al. | 222/129.4 X |

FOREIGN PATENT DOCUMENTS

| | | |
|---|---|---|
| 6218080 | 9/1980 | Australia . |
| 8747682 | 8/1982 | Australia . |
| 1198395 | 8/1982 | Canada . |
| 0028067 | 8/1980 | European Pat. Off. . |
| 0080253 | 7/1982 | European Pat. Off. . |
| 2818286 | 10/1979 | Fed. Rep. of Germany . |
| 3038045 | 8/1980 | Fed. Rep. of Germany . |
| 8405642 | 3/1984 | Fed. Rep. of Germany . |
| 54-102480 | 11/1979 | Japan . |
| 56-95098 | 8/1981 | Japan . |
| 58-84031 | 5/1983 | Japan . |
| 59-119404 | 10/1984 | Japan . |
| 2058148 | 9/1980 | United Kingdom . |

Primary Examiner—Joseph J. Rolla
Assistant Examiner—Gregory L. Huson
Attorney, Agent, or Firm—Birch, Stewart, Kolasch & Birch

[57] ABSTRACT

Apparatus for supplying water to a carbonator tank in a liquid dispensing system includes a water supply delivery control circuit which generates a periodic supply enabling signal of a relatively short duration when the water level in the tank falls below a predetermined level and an enabling signal of a comparatively longer duration when an initial filling of the tank is desired or a system reset switch is manually activated. Both periods are selected so as to prevent damage to the delivery pump, for example, due to an overload condition caused by an interruption of the water supply.

12 Claims, 3 Drawing Figures

CIRCUIT CONFIGURATION FOR THE CONTROLLED FILLING AND REFILLING OF CONTAINERS WITH LIQUIDS

BACKGROUND OF THE INVENTION

The invention relates to a circuit configuration for the controlled filling and refilling of containers with liquids by means of an input flow control unit that is responsive to electrical means implementing an intermittant supply of the liquid, and more particularly for beverage mixers having a water processing container, to which the water to be processed can be fed by means of a feed pump in accordance with one of two water-level values measured by a water-level sensor system.

It is common practice, for example, to produce blended beverages immediately before they are consumed by using a mixture consisting of carbonated water and beverage concentrates. To prepare this carbonated water, a storage tank, preferably cooled, is employed in a manner well known to those skilled in the art. Quantities of carbonated water are fed, as required, from this storage tank. Accordingly, the ingredients, i.e., $CO_2$ gas and fresh water, must be supplied to the tank. To supply $CO_2$ gas to the storage tank, the latter is connected to a $CO_2$ supply cylinder via a pressure-reducing valve assembly. To fill and refill the storage tank with fresh water, the latter is connected to a water supply line. A flow input control unit controls the input feed in accordance with the water level in the storage tank. This water level is measured by sensors which, in the interest of a simple design and simple signal processing, are preferably constructed by means of a series-connected sensor circuit. If an adequate water pressure is present in the supply line, the flow input control unit can merely be realized by means of a valve assembly that can be triggered by electrical means. However, if one cannot assume with certainty that sufficient water pressure will continuously be available in the supply line, it is necessary to provide a pump unit as a flow input control unit in conjunction with an appropriate valve assembly. The water supply pressure must be sufficiently high, because the water—at least as the storage tank is being filled—must be supplied against the pressure of the $CO_2$ gas.

It is worth considering for what mode of operation the supply flow control unit, be it the electrically triggerable valve assembly or the pumping installation, is utilized since the operating mode has a bearing on the manufacturing costs, on the functioning, and on the size of the control unit. During normal operation, for example in beverage dispensers, the supply flow control units merely operate in intervals and, on an average, the idle intervals last longer than the working intervals. However, malfunctions can occur, which prolong the working intervals by different amounts, so that the input flow control units are triggered for indefinitely long periods. Therefore, as a safeguard against such occurrences, the input flow control unit is made to be of the continuous-duty type. Also, for the majority of liquid-pumping installations, a so-called "dry run" is particularly dangerous because the result is that neither the bearing points will be lubricated, nor will the pump unit be cooled, and this leads to overheating and damage to the bearings in the pump unit. Such a dry run of the pump unit is to be feared if a water-requirement level is signaled from the storage tank while, due to a variety of reasons, and no water is available.

Therefore, the object of the invention is to provide a circuit configuration that makes it possible to design an input supply control unit for a conventional beverage dispenser, and providing essentially trouble-free operation, but wherein this unit, in the event of a malfunction, is protected against undue overloads, increased wear and destruction. For a storage tank in a beverage dispenser having a water capacity of approximately 2 liters, normal operating conditions prevail if the empty storage tank can be filled within approximately 90 to 150 seconds and can be refilled within 30 to 45 seconds when portions of carbonated water are withdrawn for the preparation of beverages.

SUMMARY

According to the invention, a circuit configuration for the controlled filling and refilling of containers with liquid that satisfies the above described requirements is characterized in that a monitoring circuit, measuring the water level in the storage tank by means of a water-level sensor, contains a gate circuit coupled between the water-level sensor system and the input flow control unit, and in that there included in said computational circuit a timing control unit that couples a signal to the gate circuit which, in the presence of a water-requirement level being sensed couples an enabling signal for each input interval for only a predetermined period. A switch is also provided for the resetting of the timing control unit.

The circuit configuration incorporating the invention and including the input flow control unit is furthermore designed for a pulse-type operation. Since the resulting operational time is of relatively short duration, a period of operation is provided that does not have a detrimental effect on the functional parts of the system. Thus, the input flow control unit can be operated at a relatively high capacity and under conditions that would otherwise lead to the destruction, or at least to the increased wear, of these functional parts. However, any continuous duty is ruled out by the technique advocated by the invention. To this end, a timing control circuit is switched into the monitoring circuit of the water-level sensor system. If a water-requirement level is present, the timing control circuit is triggered and the input flow control unit is activated for a preset time in accordance with this demand. If the water requirement is satisfied within this time, the input flow control unit is switched off and the timing control circuit reset to its off state. However, if the water-requirement demand lasts longer than the preset time, the timing control circuit activates the gate circuit, so that the input flow control unit is inevitably switched off despite the presence of the water-requirement criterion. In this case, one must assume that a malfunction has occurred that has to be remedied by an operator. An operator can then manually reset the timing control unit by means of an input switch, thereby causing another operating cycle to be carried out.

According to a preferred embodiment of the invention, the timing control circuit can thus be reset for a longer period by the input switch. The normal operating times that are taken into account in the timing control circuit for a particular refill of the storage tank during dispensing of a measured quantity from the tank content lasts, for example, 30–45 seconds. However, after a malfunction a longer operating time is made possible by a retriggering of the timing control circuit which, for example, is then set to equal the time needed for filling the tank for the first time, which can last 90–150 seconds.

According to another preferred embodiment of the novel circuit configuration, it is desired to connect a signaling device in series with the timing control circuit, which draws attention to the malfunction by means of acoustic and/or visual continuous or intermittent signals.

A malfunction can, for example, occur if water cannot be supplied because the water faucet is (still) closed, or if air or gas bubbles in the pump unit prevent the feed mechanism from operating properly.

BRIEF DESCRIPTION OF THE DRAWING

An embodiment incorporating the features of the invention will be described in detail with reference to the accompanying drawings, in which.

DETAILED DESCRIPTION OF THE PREFERRED EMBODIMENT

Figure 1:
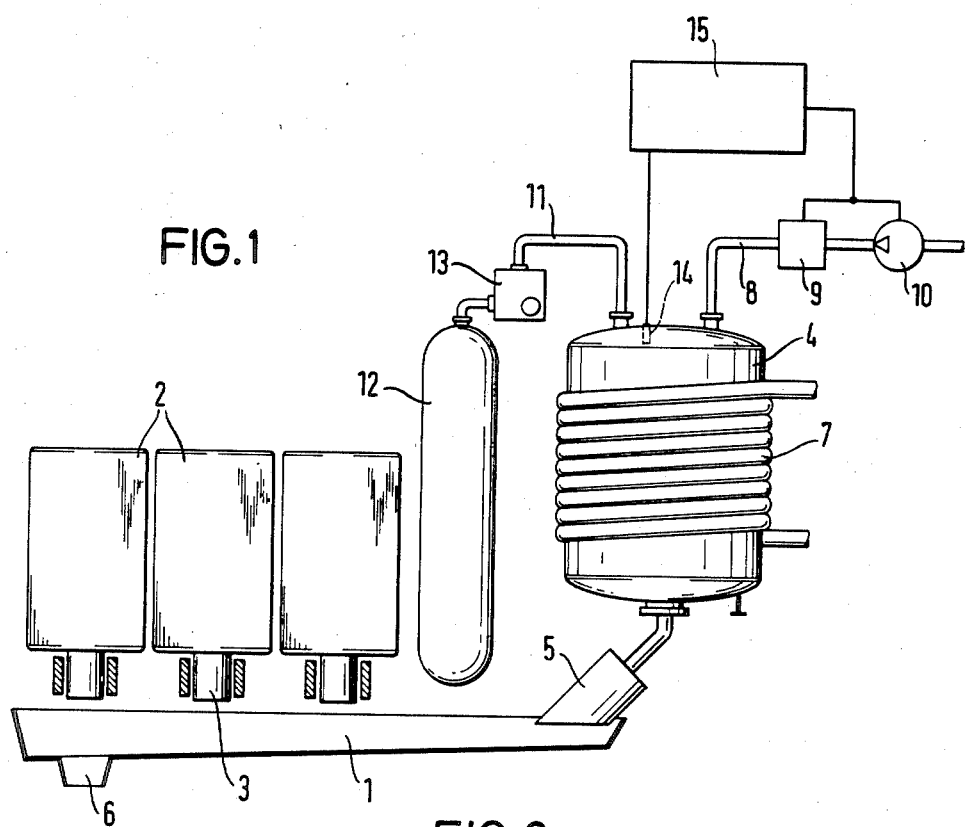
FIG. 1 is a schematic diagram of a beverage mixer.

As shown in FIG. 1, a beverage dispenser for mixing various beverage concentrates with cooled $CO_2$ water to make a blended beverage comprises, as main components, a mixing trough 1 in which the mixing process is initiated or carried out, a beverage-concentrate container 2 from which the beverage concentrates are supplied in portions to the mixing trough 1 by means of metering units 3, and a storage tank 4 from which cooled $CO_2$ water can flow into the mixing trough 1, as needed, through a dispensing valve 5. The beverage mixture issues from the mixing trough 1 through a discharge funnel 6.

The $CO_2$ water supply is cooled by means of a refrigerant which is passed through a coiled pipe or conduit 7 wound around the storage tank 4. The $CO_2$ water supply in the tank 4 is replenished by feeding fresh water through a conduit 8 controlled by a valve 9 and supported by a pump 10 and $CO_2$ gas is supplied through a pipe or conduit 11 from a container 12 filled with $CO_2$ gas controlled by a valve 13.

Because of the $CO_2$ gas, the interior of the tank 4 is subjected to a pressure which is higher than atmospheric pressure. The water in the storage tank 4 must be replenished until a measurable water level is reached in order to overcome this higher pressure, particularly if $CO_2$ water is being removed or has been removed through the dispensing valve 5. In order to ensure the supply pressure for the water, the pump system 10 is provided in addition to the valve system 9 in the conduit 8.

The water level is measured by means of a sensor 14 designed as an electrode. A variable resistance is generated by the degree of contact of this electrode 14 with carbonated water in conjunction with the metal housing wall of the storage tank 4.

Figure 2:
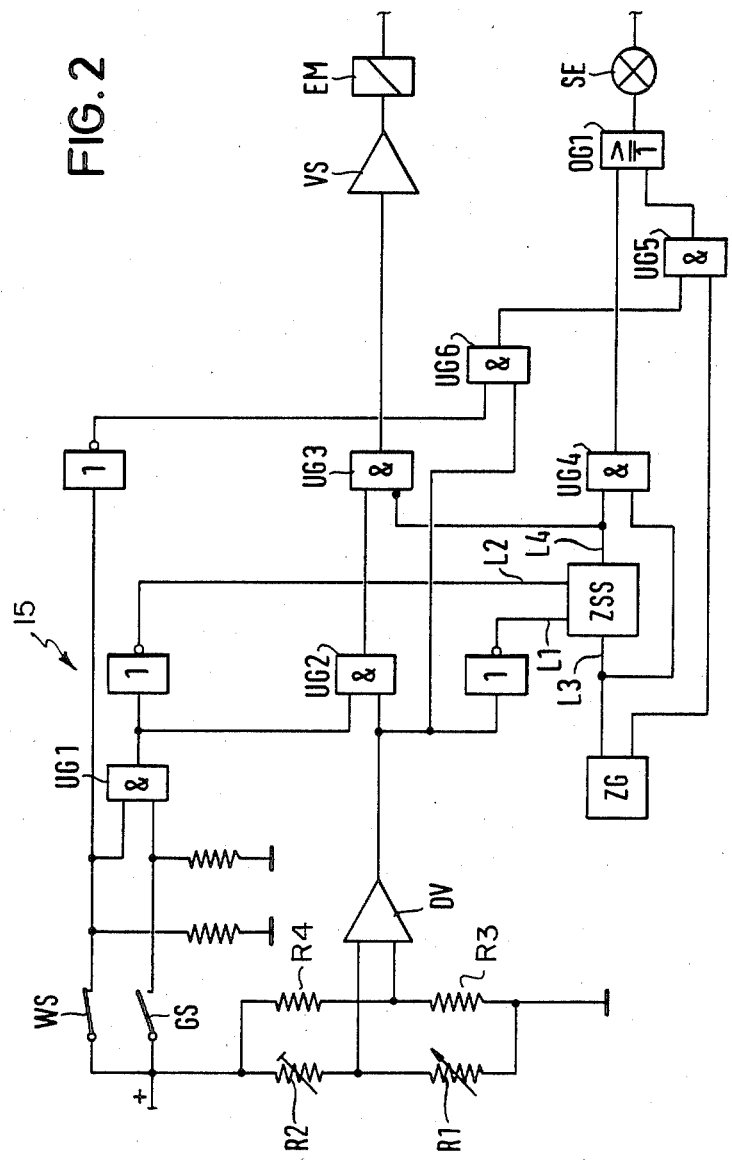
FIG. 2 is schematically illustrative of the filling and refilling control circuit for the mixer shown in FIG. 1.

In the circuit configuration depicted in FIG. 2, this variable resistance is denoted as the variable resistor R1. The variable resistance representing the particular level of the carbonated water in the storage tank 4 is measured by a monitoring circuit 15 shown in greater detail in FIG. 2, and operates for the purpose of triggering the valve 9 and the pump 10. The essential functional parts of the control circuit 15 are shown in further detail in FIG. 2.

A variable level set resistor R2 is provided for adjustment purposes, which together with the resistance R1 form a voltage divider whose center tap is connected to the input of a differential amplifier DV. A reference value for the differential amplifier DV is supplied by a second voltage divider consisting of two resistors R3 and R4. If a signal corresponding to a water-requirement level is generated at the output of the differential amplifier DV, then, with the circuit interrupter or switch GS closed and the water-supply monitor switch WS likewise closed, both being coupled to an AND gate UG1 the output of which is coupled to AND gates UG2 and UG3 as well as by an amplifier circuit VS, a solenoid EM is energized by the amplifier circuit VS, causing the valve 9 (FIG. 1) to open and the pump 10 to be put in operation.

At the same time, a timing control circuit ZSS receiving clock pulses from a clock generator ZG starts counting. After a specified time has expired, which has been set by means of the timing control circuit ZSS, the AND gate UG3 is disabled via an output signal from ZSS applied to its inverting input, thereby stopping the further operation of the valve 9 and of the pump 10. It is possible to reset the timing control circuit ZSS via lead L2 and thereby enable the AND gate UG3 by opening the switch device GS and reclosing it. In accordance with the operation of this circuit, if a malfunction occurs, intermittent signal pulses generated by the clock generator ZG are applied by means of an OR gate OG1 to a signaling device SE via an AND gate UG4.

However, if a signal for the water-requirement level output signal from the differential amplifier DV is shorter than the time specified by the timing control circuit ZSS, the counting of the interval is immediately restored to the initial count, from which counting starts anew upon the appearance of a new water-requirement level. The time interval made available in this manner is approximately 45 seconds. This period is sufficient to replenish the amount of carbonated water needed for preparing the beverage by means of the fresh water supplied. On the other hand, the reset pulse supplied to the timing control circuit ZSS when the circuit interrupter GS is actuated causes the timing control circuit ZSS to be set for an interval of, for example, 150 seconds. This interval is sufficient to fill a completely empty storage tank 4.

The circuit configuration shown in FIG. 2 additionally includes a logic inverter and AND gate UG6 that detect the opening of the water supply by means of the water-supply switch WS. A tap that is not open represents a special form of a malfunction which is easy to remedy. Therefore, it is also advisable to signal this form of malfunction. This can be done, as in the example of operation, by means of an intermittent signal transmission which differs from that used for the other malfunctions. To accomplish this, a second clock signal is switched through from the clock generator ZG via the AND gate UG5 at an appropriate signal potential and fed to the signalling device SE via the OR gate OG1.

Figure 3:
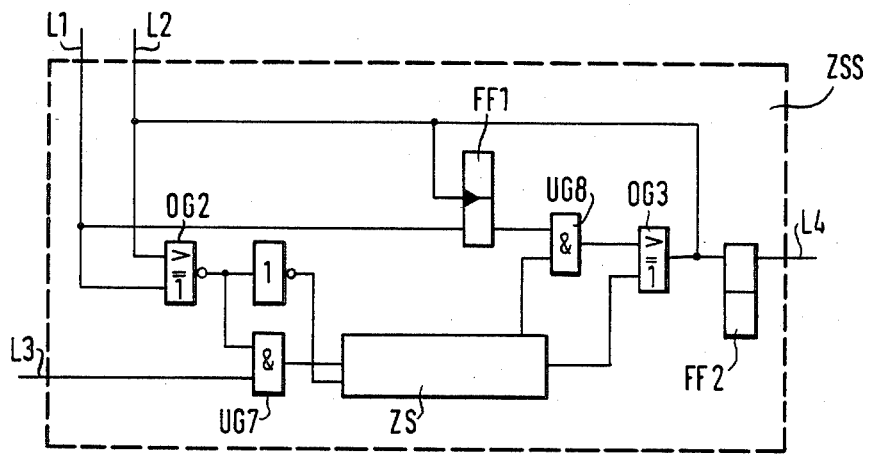
FIG. 3 is schematically illustrative of the timing control circuit included in the circuit of FIG. 2.

FIG. 3 shows an embodiment of the timing control circuit ZSS depicted in FIG. 2. The pulses generated by the clock generator ZG are applied via the line L3 to the AND gate UG7 and are coupled thereby to the input of a counter circuit ZS when both the switches GS and WS are closed and a water-requirement demand signal is outputted by the differential amplifier DV. In this instance, there is applied to each of the input lines L1 and L2 a "binary 0" potential by virtue of the elements coupled thereto. On completion of the water-filling process, a "binary 1" potential is applied to the line L1. The AND gate UG7 is disabled via the output of the NOR gate OG2 and at the same time the counting circuit is reset via the reset input coupled to the logic inverter. The counter circuit ZS has a counting cycle which corresponds to the maximum time interval available when the apparatus is started or restarted. If this time interval has expired within a counting operation, a signal appears at the carry-output of the counting circuit ZS, which sets a bistable flip-flop FF2 via the OR gate OG3, which then allows the clock pulses to be coupled to the signaling device SE via the AND gate UG4 (FIG. 2). A malfunction is signalled and at the same time the AND gate UG3 shown in FIG. 2 is disabled.

The system can now be restarted only after the switch device GS is opened and reclosed. A "binary 1" potential is applied to the line L2 when the switch device GS is in the open position due to the logic inverter coupled to AND gate UG1. This causes both the counting circuit ZS and the bistable flip-flop FF2 to be reset due to a "binary 1" signal being applied to their respective reset inputs.

Upon closing the device switch GS, a "binary 1" potential is applied to the inverting clock input of a bistable flip-flop FF1 which in turn disables the AND gate UG8. If, after a closing of the switch device GS and a refill operation has been completed, "binary 1" potential now applied to the line resets the flip-flop FF1 causing the AND gate UG8 to be turned on for a new counting period of the counting circuit ZS. This new period of the counting circuit ZS, however, is now caused to have a shortened time interval. In the binary counter used in the example, the relationship to the total time can simply be selected 1:2 and 1:4 and topped off. Non-binary ratios require a decoder circuit downstream of the counting circuit ZS. The through-put of the AND gate UG8 causes the time interval provided for the refilling of the water supply after the first filling interval to be correspondingly shortened. If a shortened time interval is exceeded, the flip-flop FF2 is set via the AND gate UG8 and the OR gate OG3 signalling that the water supply has been interrupted and that the alarm is to be set off.

Therefore, as a result of the circuit shown and described herein, an overuse of the valve 9, and particularly of the pump 10, is limited in time so that there is no danger to the functional units thereof. However it should be noted that, when desirable, the circuit arrangement shown and described herein for controlling the system can also be implemented in the form of a microprocessor controller.

Having thus shown and described what is at present considered to be the preferred embodiment of the invention, it should be understood that the same has been made by way of illustration and not limitation. Accordingly, all modifications, alterations and changes coming within the spirit and scope of the invention are herein meant to be included.

We claim:

1. Apparatus for supplying water, on demand, to a carbonator tank in a dispenser system, comprising:

(a) system reset switch means for generating a first water demand signal for initiating a first filling operational mode of said tank;
    (b) liquid level sensor means for sensing when the level of water falls below a predetermined level in said tank;
    (c) means coupled to said sensor means for generating a second water demand signal for initiating a second filling operational mode of said tank;
    (d) control circuit means including timer means generating first and second time period signals, respectively, and enabled by said first and second water demand signals, said first period signal being longer in duration than said second period signal, said timer periods being of a predetermined duration to prevent overloading and damage to system components including water supply means in the event of a malfunction, such as an interruption of supply water to said tank;
    (e) water supply means for supplying water to said carbonator tank from an external source; and
    (f) means responsive to said first and second time period signals for activating said water supply means for each of said first and second time periods, separately, and thereafter deactivating said supply means.

2. Apparatus according to claim 1 wherein said control circuit means includes means for inhibiting said timer means and the generation of said second time period signal in the event the water level reaches said predetermined level prior to the full duration of said second period signal.

3. Apparatus according to claim 1 wherein said supply means includes a valve coupled to a water supply.

4. Apparatus according to claim 1 wherein said supply means includes a pump coupled to a water supply.

5. Apparatus according to claim 1 wherein said first filling mode includes an initial tank filling operation and an extended filling operation initiated by a subsequent activation of said reset switch means.

6. Apparatus according to claim 5 wherein said second filling mode comprises an intermittant automatic refilling operation.

7. Apparatus according to claim 6 wherein said first time period signal has a period ranging between 90 and 150 seconds and said second time period signal has a period ranging between 30 to 45 seconds.

8. Apparatus according to claim 1 and further comprising:

(g) water supply switch means for generating a water availability signal, said water availability signal being coupled to said control circuit and being operable to inhibit said supply means in the absence of supply water.

9. Apparatus according to claim 8 wherein said control circuit means additionally includes means responsive to the absence of said water availability signal to generate a signal indicative of a malfunction.

10. Apparatus according to claim 9 wherein said malfunction signal generating means generates an intermittant signal.

11. Apparatus according to claim 8 wherein said timer means includes a binary clock signal generator and a binary digital counter circuit coupled thereto, and wherein said control circuit means comprises digital logic circuit means coupled to said water supply switch means generating said water availability signal, said system reset switch means generating said first water demand signal and said means generating said second water demand signal, said logic circuit means being operable to control the counting operation of said counter circuit and further including a logic gate implementing said means (f) for activating said supply means, said counter circuit generating said first and second period signals which are thereafter coupled to said logic gate.

12. Apparatus according to claim 11 wherein said digital logic circuit means are integrated within a microprocessor circuit.

* * * * *